United States Patent [19]

Baldwin

Best Available Copy

[11] E Re. 30,498

[45] Reissued Jan. 27, 1981

[54] FILAMENT SHOCK MOUNTING FOR LAMPS

[75] Inventor: George D. Baldwin, Jamestown, N.Y.

[73] Assignee: Truck-Lite Co., Inc., Jamestown, N.Y.

[21] Appl. No.: 936,794

[22] Filed: Aug. 25, 1978

Related U.S. Patent Documents

Reissue of:

[64] Patent No.: 3,327,110
Issued: Jun. 20, 1967
Appl. No.: 453,700
Filed: May 6, 1965

[51] Int. Cl.[3] ..... F21V 15/04

[52] U.S. Cl. ..... 362/296; 362/390; 264/262; 248/605; 248/618; 248/314

[58] Field of Search ..... 362/296, 369, 390, 72–73, 362/77–79, 80–83, 274, 306, 372, 288, 365, 368; 264/262, 264; 248/314, 603–606, 610, 617, 560

[56] References Cited

U.S. PATENT DOCUMENTS

| | | | |
|---|---|---|---|
| 1,435,763 | 11/1922 | Townsend | 362/274 |
| 1,786,758 | 12/1930 | Larson | 362/390 |
| 1,817,091 | 8/1931 | Miller | 362/306 |
| 2,312,300 | 2/1943 | Baerwald | 362/78 |
| 2,610,290 | 9/1952 | Braunsborff | 362/306 |
| 2,688,278 | 2/1954 | Avery | 362/369 |
| 2,706,611 | 4/1955 | Kimball | 248/314 |
| 2,814,722 | 11/1957 | Diedring | 362/369 |
| 2,845,245 | 7/1958 | Gray | 248/314 |
| 3,300,636 | 3/1964 | Quelland | 362/372 |
| 3,327,110 | 6/1967 | Baldwin | 362/296 |
| 3,666,940 | 5/1972 | Magi | 362/369 |
| 3,678,266 | 7/1972 | Fradette | 362/369 |

*Primary Examiner*—Stephen C. Bentley
*Assistant Examiner*—Edward F. Miles
*Attorney, Agent, or Firm*—Mason, Fenwick & Lawrence

[57] ABSTRACT

*A lamp assembly particularly suited for vehicle mounting and adapted to be subjected to vibratory shock loads including a rigid reflector and a relatively flexible bulb suspension structure supported on the reflector having a receptacle or basket formation for receiving a bulb. The suspension structure includes a pair of elastically deformable flexible arms extending laterally oppositely from the receptacle formation along horizontal serpentine paths having portions forming U-curves about vertical axes to accommodate horizontal flexing and are pivotally mounted at their outer ends on the reflector.*

18 Claims, 5 Drawing Figures

FILAMENT SHOCK MOUNTING FOR LAMPS

Matter enclosed in heavy brackets [ ] appears in the original patent but forms no part of this reissue specification; matter printed in italics indicates the additions made by reissue.

This invention relates to a new and useful lamp assembly particularly suited for vehicle mounting.

A primary object of the present invention is to provide a vehicle mounted lamp assembly which successively copes with the problem of filament failure because of a repetitive shock loading thereof.

An additional object of the present invention in accordance with the foregoing object, is to provide a shock absorbing mounting for an incandescent lamp bulb of a vehicle mounted lamp assembly which successfully copes *with shock loading of the filament* of the bulb in all directions so as to minimize the severe impulse forces otherwise applied to the bulb filament.

Shock mountings heretofore devised for reducing the shock forces imposed on bulb filaments have involved considerably expensive arrangements from both a manufacturing and installational standpoint. Furthermore, prior shock mountings while effective to a certain degree have not been able to cope with impulse forces applied in certain directions to the lamp assembly. The arrangement of the present invention has therefore overcome all of the aforementioned disadvantages of prior art arrangements both with respect to the degree of effectiveness of the shock mounting and its manufacturing and installational economy.

In accordance with the foregoing objects, the shock mounting of the present invention involves the mounting of a bulb within a receptacle or basket elastically suspended on the lamp reflector. A resilient potting material such as disclosed in prior Patent No. 3,089,951 could be utilized to secure the lamp bulb within the receptacle if an unbased bulb is to be used. The receptacle is also suspended by means of a pair of flexible torque arms which are connected tangentially to the receptacle and are pivotally anchored by pillars projecting from the lamp reflector about fixed, parallel spaced axes disposed on either side of the bulb. Accordingly, the flexible torque arms are pivotally displaceable about the fixed axes so as to accommodate limited linear displacement of the bulb in a direction perpendicular to the fixed supporting axes while the flexible arms themselves are elastically deformable to accommodate displacement of the receptacle and the bulb positioned therein in all other directions.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 1:
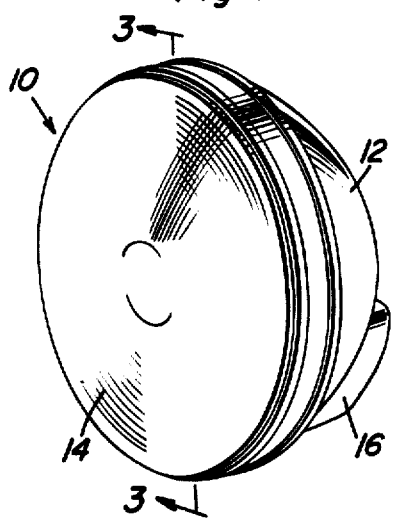
FIG. 1 is a perspective view of a lamp assembly constructed in accordance with the present invention.

Referring now to the drawings in detail, the lamp assembly shown in FIG. 1 and generally denoted by reference numeral 10 includes a curved reflector member 12 adapted to be securely mounted in any suitable fashion on a vehicle by virtue of which it is subjected to severe impulse force. A lens cover 14 is sealed to the opened end of the reflector. As more clearly seen in FIG. 3, the reflector is formed with a rearwardly projecting portion 16 within which a plurality of electrical connector elements 18 are mounted adapted to receive an electrical connecting plug 20 through which electrical connections are established with tungsten filaments 22 enclosed within a conventional incandescent lamp bulb 24.

Figure 3:
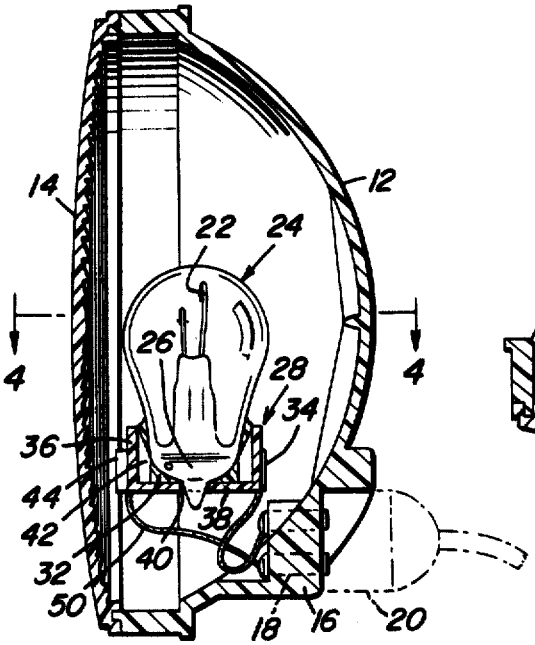
FIG. 3 is a sectional view throughout the lamp assembly taken substantially throughout a plane indicated by section line 3—3 in FIG. 1.

With continued reference to FIG. 3, it will be observed that the bulb 24 includes an unbased portion 26 received within a receptacle portion 28 of a suspension device generally referred to by reference numeral 30. The unbased portion of the bulb is secured in position within the receptacle portion by use of a resilient potting material as aforementioned held in a predetermined orientation relative to the reflector 12 in order to emit light through the lens cover 14. The receptacle portion 28 therefore forms a receiving chamber within which the potting material 32 is retained and through which filament leads 34 extend.

The receptacle portion 28 of the suspension device includes an annular wall 36 generally circular in cross section connected to a bottom wall 38 having a central opening 40 through which the exhaust tube portion 26 of the bulb extends. Also projecting radially inwardly from the annular wall 36, are a plurality of equally spaced positioning ribs 42 by means of which the bulb 24 is supported within the receptacle in proper position when being embedded within the potting material 32. Also formed externally of the annular wall 36, are grooved projections 44, 46, and 48 as more clearly seen in FIGS. 4 and 5. These grooved projections receive the filament leads 34 aforementioned so that they may be firmly held in fixed relation to the receptacle portion 24 of the suspension device and yet be electrically connected through the flexible connectors 50 to the contact elements 18. These flexible connectors 50 are needed in view of the limited movement of the bulb and receptacle portion 28 under the vibratory forces imposed thereon because of the mounting of the relatively rigid reflector 12 on the vehicle.

Figure 2:
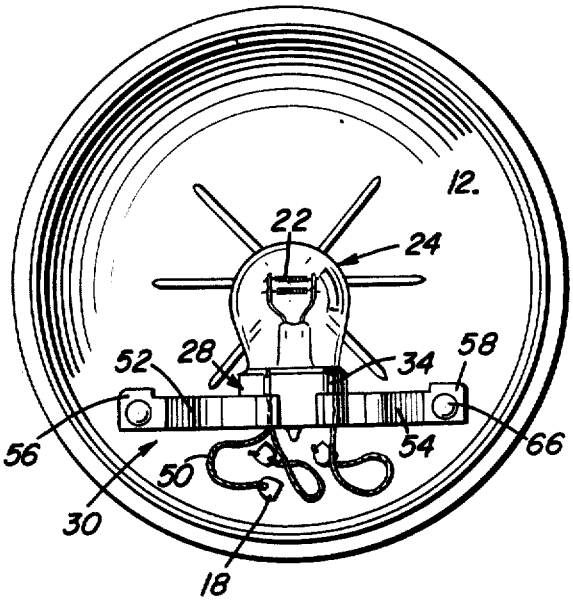
FIG. 2 is a front elevational view of the lamp assembly with the lens cover removed.

In order to accommodate limited displacement of the receptacle portion 28 together with the bulb mounted therein, the suspension device 30 includes a pair of resilient torque arms 52 and 54. These arms are connected to the annular wall 36 of the receptacle portion in substantial tangential relation thereto and at locations which are diametrically spaced apart as more clearly seen in FIG. 4. The arms are also bent *to form sinuous strips curving along like horizontal reverse curve paths throughout the vertical height of each arm so as to define substantially U-curves about vertical axes of curvature* so that they may flex in a generally horizontal plane in order to accommodate displacement of the receptacle portion parallel to this plane. *As will be evident from the top plan view of FIG. 4 and from FIGS. 5 and 2, the flexible torque*

*arms 52 and 54 thus form sinuous strips of generally rectangular transverse cross section having greater vertical than horizontal dimension which curve along like horizontal reverse curve paths throughout the vertical height of the respective arm or like reverse curve paths at all section planes through the respective arm paralleling the longitudinal medial plane of the arm, enabling the arms to accommodate receptacle displacement in all horizontal directions. As used herein and in the claims, the term "sinuous strip" signifies a ribbon-like band or strap which is thin in its horizontal transverse dimension and larger in its vertical transverse dimension and winds or bends in directions perpendicular to its larger vertical dimension in a sinuous fashion forming curves which have vertical axes of curvature and the term "reverse curve paths" which are referred to as horizontal or as lying in section planes paralleling the longitudinal medial planes of the arms signify a generally S-shaped curve path formed by joining two simple curves turning in opposite directions.* It will also be apparent that the tangential connection of the flexible arms to the receptacle portion will accommodate angular displacement of the receptacle portion about a vertical axis. It will therefore be apparent that the anchoring of the end tab portions 56 and 58 of the flexible arms on the reflector will suspend the receptacle portion 28 for displacement in all directions parallel to the horizontal plane.

Figure 4:
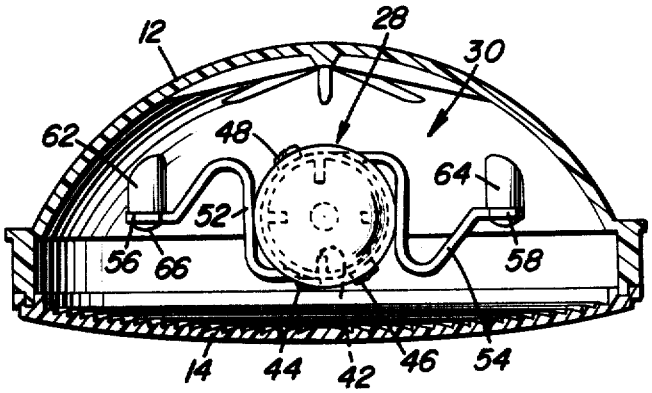
FIG. 4 is a transverse sectional view taken substantially throughout a plane indicated by section line 4—4 in FIG. 3.
Figure 5:
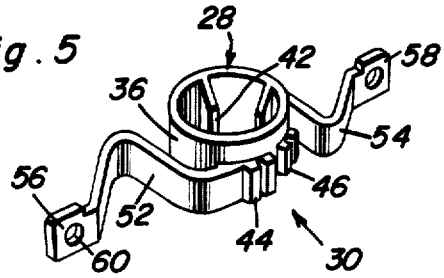
FIG. 5 is a perspective view of the bulb suspension device associated with the lamp assembly of the present invention.

The end tab portions 56 and 58 of the flexible arms are provided with apertures 60 as more clearly shown in FIG. 5 so that they may be pivotally mounted on the reflector 12 about parallel spaced axes established through forwardly projecting pillars 62 and 64 secured to the reflector as shown in FIG. 4. The end tab portions will be pivotally connected to the pillars by any suitable means such as the plastic lugs 66 which extend through the aperture 60 and are heat peened in order to retain the flexible arms assembled on the ends of the pillars. The pivotal mounting of the flexible arms is sufficiently tight in order to eliminate any excess pivotal freedom yet permit a limited amount of pivotal displacement about the supporting axes established through the pillars. It will therefore be apparent that the flexible arms 52 and 54 will act as a torque suspension for the receptacle portion 28 to which they are connected in order to dampen vertical displacement thereof in a direction perpendicular to the horizontal plane. Accordingly, not only may the suspension device accommodate horizontal and displacement of the receptacle portion in the horizontal plane because of the flexure of the arms 52 and 54 but will also accommodate vertical displacement of the receptacle portion and tilting thereof because of the limited pivotal displacement of the arms about the supporting axes established through the pillars 62 and 64.

From the foregoing description, the construction and utility of the lamp assembly and in particular the bulb suspension facilities will be apparent. It will therefore be appreciated that the suspension device 30 may be constructed as a one piece member from a suitable material such as plastics or metals or from a composite construction arranged to be readily installed by pivotal support on the pillars 62 and 64 as aforementioned. The bulb 24 when positioned within the receptacle portion 28 and secured in proper position therein will therefore be suspended in such a fashion that impulse forces will be dampened regardless of the direction in which they are imposed on the lamp assembly by virtue of the mounting of the reflector on the vehicle. It will also be apparent that the manufacture and installation of the suspension device as well as the mounting of the bulb therein may be accomplished with substantial economy.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A lamp adapted to be subjected to [the ] vibratory shock loads comprising, a relatively rigid reflector, relatively flexible suspension means having a receptacle portion, a bulb supported by said receptacle portion in a predetermined orientation relative to said reflector, *said suspension means including a pair of elastically deformable elongated flexible arms disposed horizontally in the use position of the lamp each extending laterally from the receptacle portion as a sinuous strip curving along like horizontally reverse curve paths throughout the arm's vertical height defining substantially U-curves about vertical axes of curvature for accommodating flexing in horizontal directions,* and means pivotally mounting said suspension means between parallel spaced supporting axes fixed relative to the reflector for limited elastic displacement of the receptacle portion in a direction perpendicular to said supporting axes.

2. The combination of claim 1 wherein said [suspension means includes a] pair of flexible arms *are* tangentially secured to the receptacle portion for accommodating angular and linear displacement of the receptacle portion between said supporting axes, said arms having end tab portions pivotally connected to said pivotal mounting means.

3. The combination of claim 2 wherein said receptacle portion includes an annular wall to which the flexible arms are connected, a bottom wall connected to the annular wall to form a chamber receiving the bulb, and positioning ribs projecting radially inwardly from the annular wall for holding the bulb in said predetermined orientation.

4. The combination of claim 3 wherein said bulb includes an unbased portion received within the receptacle portion and potting material securing the unbased portion to the receptacle portion.

5. The combination of claim 4 wherein said annular wall of the receptacle portion is provided with external grooves for receiving filament leads extending from the bulb, electrical contacts fixedly mounted by the reflector in spaced relation to the suspension means, and flexible connectors electrically connecting said contacts to the filament leads within the grooves.

6. The combination of claim 1 wherein said receptacle portion includes an annular wall, a bottom wall connected to the annular wall to form a chamber receiving the bulb, and positioning ribs projecting radially inwardly from the annular wall for holding the bulb in said predetermined orientation.

7. The combination of claim 6 wherein said annular wall of the receptacle portion is provided with external grooves for receiving filament leads extending from the bulb, electrical contacts fixedly mounted by the reflector in spaced relation to the suspension means, and flexible connectors electrically connecting said contacts to the filament leads within the grooves.

8. The combination of claim 1 wherein said bulb includes an unbased portion received within the receptacle portion, and potting material securing the unbased portion to the receptacle portion.

9. The combination of claim 8 wherein said [suspension means includes a] pair of flexible arms *are* tangentially secured to the receptacle portion for accommodating angular and linear displacement of the receptacle portion between said supporting axes, said arms having end tab portions pivotally connected to said pivotal mounting means.

10. In a lamp having a reflector and a pair of mounting pillars projecting therefrom, a suspension device for mounting a bulb in spaced relation to the reflector comprising, a receptacle portion receiving said bulb in a predetermined orientation relative to the reflector, a pair of flexible arms tangentially connected to the receptacle portion *each extending horizontally in the use position of the lamp as a sinuous strip curving about vertical axes of curvature along like horizontal reverse curve paths throughout the vertical height of each such arm* for accommodating linear displacement thereof in all directions parallel to a horizontal plane, said arms having end portions pivotally connected to the pillars about parallel spaced axes for accommodating displacement of the receptacle portion in a direction perpendicular to said horizontal plane, whereby vibration is dampened in all directions to prevent shock loading of the filament within the bulb.

11. The combination of claim 12 wherein said bulb includes an unbased portion received within the receptacle portion and potting material securing the unbased portion to the receptacle portion.

*12. The combination of claim 1, wherein said flexible arms are of a strip shape of generally rectangular transverse cross-section having greater vertical than horizontal dimension of a material to be flexibly deformed vertically and thereby also accommodate vertical displacement of the receptacle portion in the portions of said arms between said receptacle portion and said pillars.*

*13. The combination of claim 1, wherein said suspension means is a one-piece member of elastically deformable flexible material, said flexible arms being horizontally thin strap like arms of substantially uniform vertical height and of greater vertical than horizontal transverse dimension extending along said reverse curve paths forming laterally facing strip surface curving cylindrically about vertical axes of curvature.*

*14. The combination of claim 12, wherein said suspension device is a one-piece member of elastically deformable flexible material, said flexible arms being horizontally thin strap like arms of substantially uniform vertical height and of greater vertical than horizontal transverse dimension extending along said horizontal reverse curve paths forming laterally facing strip surfaces curving cylindrically about vertical axes of curvature.*

*15. In a lamp having a reflector and a pair of mounting pillars projecting therefrom forming parallel spaced supporting axes lying in a common horizontal plane in the use position of the lamp, a suspension device for mounting a bulb in spaced relation to the reflector comprising, a receptacle portion receiving said bulb in a predetermined orientation relative to the reflector, a pair of elongated flexible arms tangentially connected to the receptacle portion and extending to said pillars along longitudinal medial planes which include said support axes for accommodating linear displacement thereof in all directions parallel to a horizontal plane, each of said arms extending laterally from the receptacle portion as a continuous strip curving along like uniplanar reverse curve paths at all section planes through the arm paralleling the medial plane forming substantially U-curved shock absorbing bends about vertical axes of curvature and having end portions pivotally connected to the pillars about parallel spaced axes for accommodating displacement of the receptacle portion in a direction perpendicular to said horizontal plane, whereby vibration is dampened in all directions to prevent shock loading of the filament within the bulb.*

*16. The combination of claim 15, wherein said flexible arms are of a strip shape of generally rectangular transverse cross-section having greater vertical than horizontal dimension of a material to be flexibly deformed vertically and thereby also accommodate vertical displacement of the receptacle portion in the portions of said arms between said receptacle portion and said pillars.*

*17. The combination of claim 16, wherein said suspension device is a one-piece member of elastically deformable flexible material, said flexible arms being horizontally thin strap like arms extending along said reverse curve paths forming laterally facing curving cylindrically strip surfaces about vertical axes of curvature.*

*18. The combination of claim 15, wherein said suspension device is a one-piece member of elastically deformable flexible material, said flexible arms being horizontally thin strap like arms of substantially uniform vertical height and of greater vertical than horizontal transverse dimension extending along said reverse curve paths forming laterally facing strip surface curving cylindrically about vertical axes of curvature.*

* * * * *